Sept. 27, 1955 C. H. JUDISCH 2,718,659
APPARATUS AND PROCESS FOR RECOILING COILS
Filed Dec. 20, 1954 5 Sheets-Sheet 1
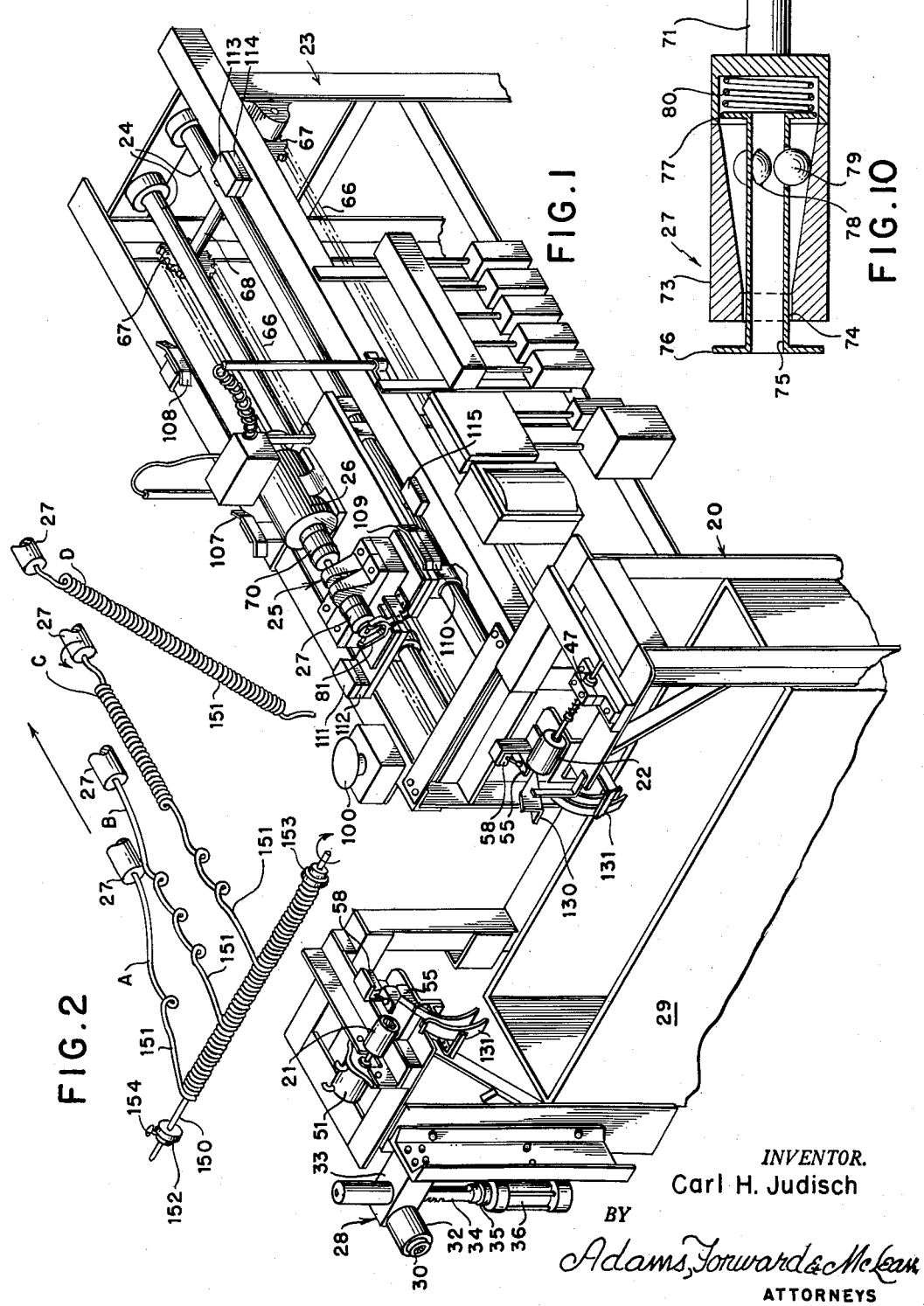
INVENTOR.
Carl H. Judisch
BY
Adams, Forward & McLean
ATTORNEYS Sept. 27, 1955    C. H. JUDISCH    2,718,659
APPARATUS AND PROCESS FOR RECOILING COILS
Filed Dec. 20, 1954    5 Sheets-Sheet 2
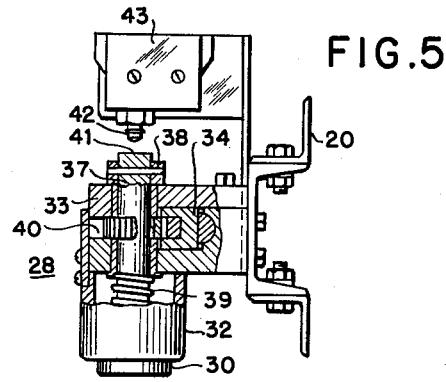
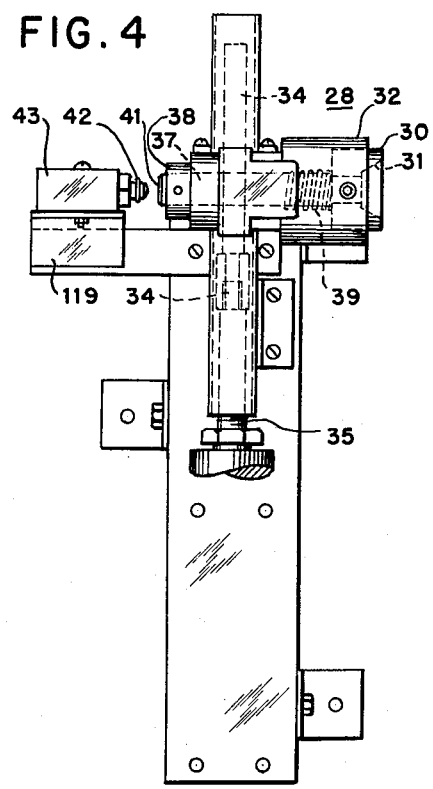
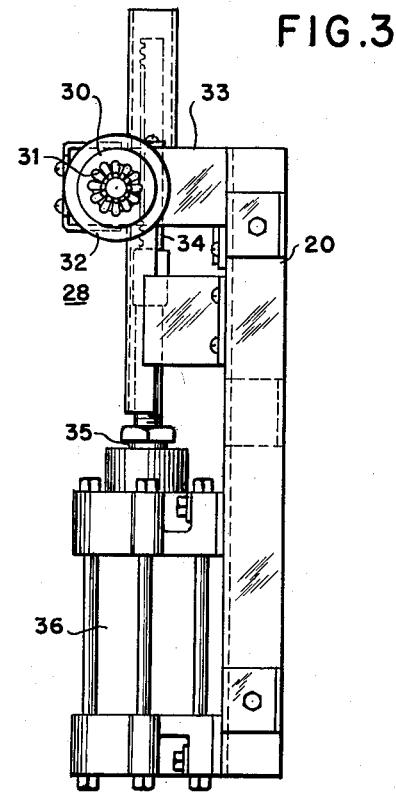
INVENTOR.
Carl H. Judisch
BY
Adams, Forward & McLean
ATTORNEYS

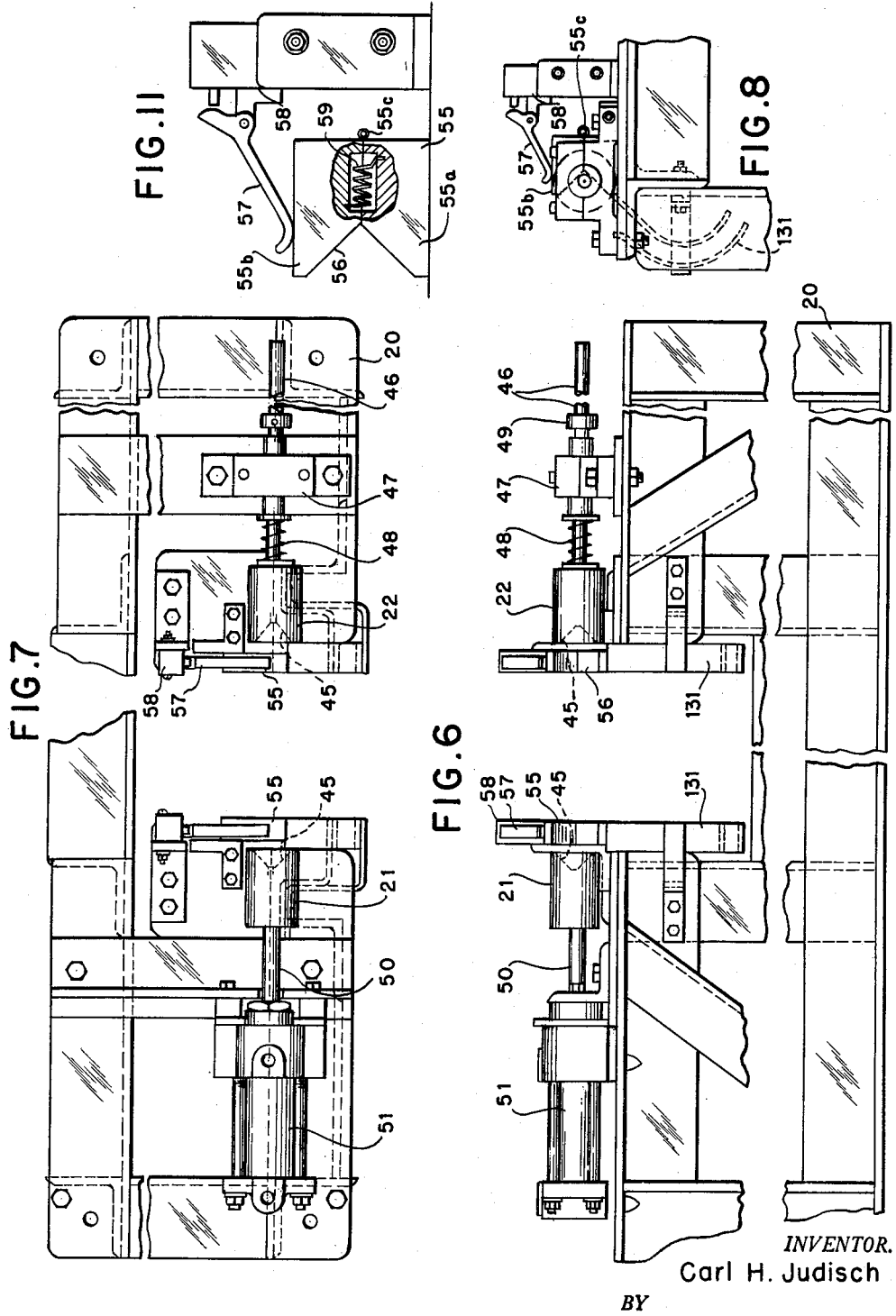

Sept. 27, 1955 C. H. JUDISCH 2,718,659
APPARATUS AND PROCESS FOR RECOILING COILS
Filed Dec. 20, 1954 5 Sheets-Sheet 4

INVENTOR.
Carl H. Judisch
BY
Adams, Forward & McLean
ATTORNEYS

Sept. 27, 1955    C. H. JUDISCH    2,718,659
APPARATUS AND PROCESS FOR RECOILING COILS
Filed Dec. 20, 1954    5 Sheets-Sheet 5
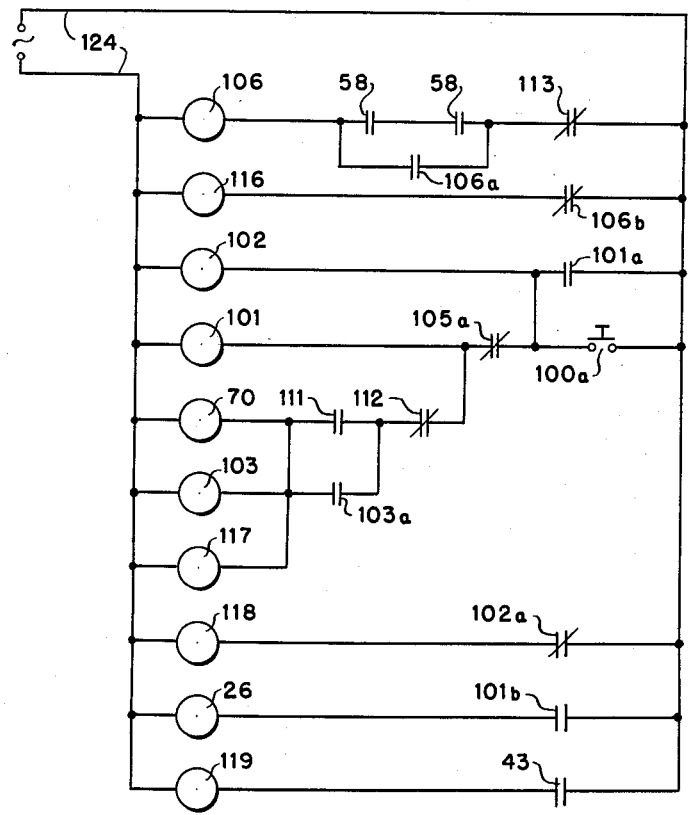
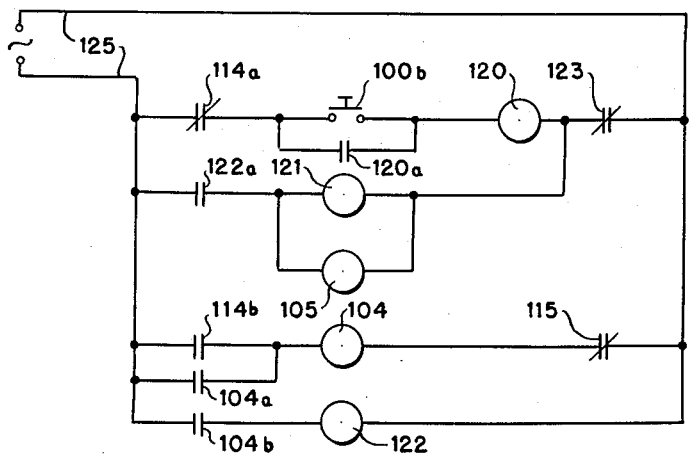
FIG.12
INVENTOR.
Carl H. Judisch
BY
Adams, Forward & McLean
ATTORNEYS

United States Patent Office 2,718,659
Patented Sept. 27, 1955

2,718,659
APPARATUS AND PROCESS FOR RECOILING COILS

Carl H. Judisch, Hamden, Conn., assignor to Whitney Blake Company, New Haven, Conn., a corporation of Connecticut Application December 20, 1954, Serial No. 476,272

8 Claims. (Cl. 18—1)

This invention relates to the manufacture of retractile cords and provides, in particular, an apparatus for simultaneously unwinding and reversing preformed helically wound cords.

United States Patent 2,173,096 to Campbell discloses that retractile, i. e., elastically extensible, cords, such as electrical cables, can be formed by molding an elongated resilient body in helical form, thereafter reversing the pitch of the loops constituting the helix.

Usually, and particularly in the case of electrical cables, the elongated resilient body is prepared in helical form by winding an uncured plastic material, such as unvulcanized rubber, helically about a mandrel. Thereafter the mandrel and winding are subjected to heat or other suitable curing conditions to set the winding in its helical form. The helix is then removed from the mandrel and thereafter the pitch of the loops of the helix is reversed.

The Campbell patent also proposes that unwinding of the helix from the mandrel and pitch reversal can be accomplished in essentially a continuous operation in which the helix is unwound from a first mandrel and fed to a second mandrel upon which it is rewound in a reverse direction.

Commercially, however, it has been found preferable to remove the helix from the vulcanizing mandrel and, thereafter, securing one end of the helix in a rotatable chuck, to rewind the helix in the opposite direction by rotating the chuck in the same direction as the pitch of the helix, retaining the other end of the helix in a fixed position. This method of pitch reversal is disclosed in United States Patent 2,478,861 to Collins et al.

A particularly suitable mandrel upon which a helix of any desired length may be readily wound, vulcanized and removed is disclosed in United States Patent 2,586,763 to Judisch. The mandrel comprises a winding arbor, which usually is a straight cylindrical bar, upon which are mounted a pair of terminal holding heads. The heads are essentially identical and are placed over opposite ends of the arbor confronting each other. One head, the winding head, is affixed to the arbor at all times while the other head, the clamping head, is adjustably slidable along the arbor to be fixed in any desired position by a thumb screw. The confronting faces of the two heads are each provided with a groove about the arbor for receiving an end loop of the helix and are also provided with a tangential branch groove for receiving a free end of the helix. In usage, the clamping head is released and slipped down toward the end of the arbor away from the winding head. Pre-cut cord having an uncured or partially cured body is then wound on the arbor, laying one end of the cord in the branch groove of the winding head, and thereafter rotating the arbor and feeding the cord onto the arbor in a tightly arranged, single layer winding. As the other end of the cord is reached, the clamping head is slipped down tightly against the coil with the end being received by the branch groove of the clamping head. The clamping head is then secured and the assembled mandrel and winding are placed in an oven, or are otherwise subjected to curing conditions, to set the plastic body to a resilient elastic condition. After curing, the clamping head is loosened or removed and the helix which has been formed is unwound or slipped off the arbor. Thereafter, the pitch of the helix must be reversed.

It is a particular object of this invention to accomplish simultaneous unwinding and pitch reversal of cords helically wound upon an arbor eliminating the necessity of manual removal and handling intermediate the unwinding and reversing steps which has heretofore usually been employed.

It is a further object of this invention to utilize the high speed reversing technique of Collins et al. while at the same time unwinding the helix from the mandrel upon which is was formed.

It is still another object of this invention to provide an apparatus which is particularly suitable for unwinding and reversing helical cords formed on the mandrel of the type disclosed and claimed in the Judisch patent.

These and other objects of this invention are accomplished by mounting the mandrel for rotative movement about its axis, connecting one end of the helix to a rotatable chuck and thereafter driving the chuck, while rotating it, in a direction at an angle to the axis of the mandrel. Thus the invention contemplates a method and apparatus which will withdraw one end of a resilient helical body from a mandrel upon which it is wound to remove the helix from the mandrel, draw it into free space, and during such removal while the other end of the helix is still wound upon the mandrel rotate the helix at its unwound end to reverse the pitch of its loops such that the helix is completely reversed as removal of the helix from the mandrel is completed.

It is also contemplated by this invention to accomplish the simultaneous unwinding and reversing operation by means of a movable carriage mounted on an open-ended, and preferably straight, race along which devices responsive to the positioning of the carriage on the race perform such functions as activating and deactivating the reversing mechanism during the drive of the carriage along the race in a direction away from the mandrel. The sole manual operations required to operate the mechanism and carry out the process thereby consist in placing a mandrel with a helix wound upon it in position, unwinding and inserting an end of the helix in the withdrawal apparatus and initiating operation of the machine.

These and other objects of this invention are more fully explained in the accompanying drawing to which reference is made hereinafter and in which:

Figure 1 is an isometric view of an apparatus embodying the principles of my invention;

Figure 2 is an isometric view of the simultaneous unwinding and reversing of a helix wound upon a mandrel in accordance with my invention with particular reference to the apparatus illustrated in Figure 1 showing four different positions consecutively designated A, B, C and D;

Figure 3 is a front elevational view of a part of the apparatus shown in Figure 1;

Figure 4 is a side elevational view of the same part of the apparatus shown in Figure 3;

Figure 5 is a partially sectioned plan view of the part of the apparatus shown in Figures 3 and 4;

Figure 6 is a front elevational view of another part part of the apparatus shown in Figure 1;

Figure 7 is a plan view of the part of the apparatus shown in Figure 6;

Figure 8 is a fragmentary end view of the part of the apparatus shown in Figures 6 and 7;

Figure 10 is a sectional view through a line-grasping device employed in the apparatus shown in Figure 1;

Figure 11 is a side view of a mandrel actuated device employed in the apparatus shown in Figure 1; and Figure 12 diagrammatically represents an electrical and pneumatic control system providing semi-automatic operation of the apparatus shown in Figure 1.

Figure 9:
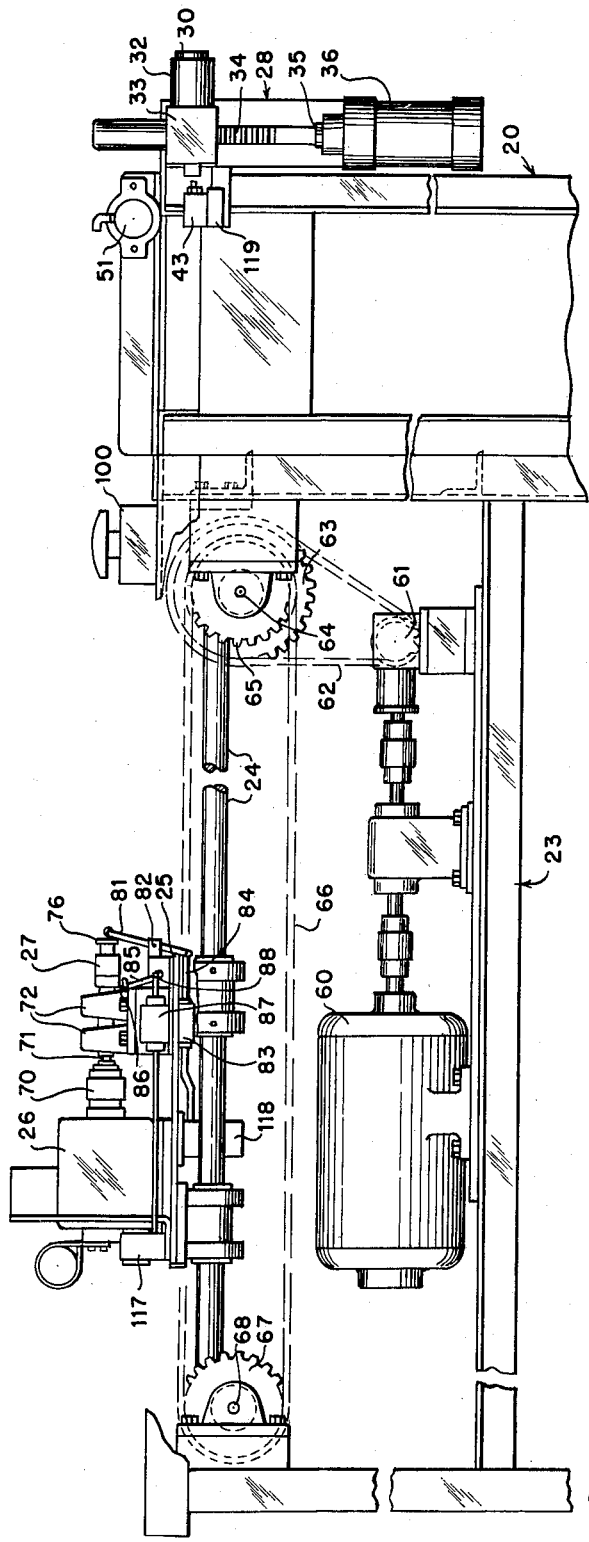
Figure 9 is a side elevation of the apparatus shown in Figure 1.

In the drawings the reference numeral 20 represents a frame base upon which are positioned mandrel receiving jaws 21 and 22.

The reference numeral 23 represents a second frame base which carries a pair of parallel slide bars 24 which constitute a race for a carriage 25. Carriage 25 supports a motor 26 connected to rotate a line-grasping chuck 27. Frame base 23 is positioned adjacent to frame base 20 such that race 24 is substantially perpendicular to the line of jaws 21 and 22 with an end of the race adjacent to such line of jaws 21 and 22. Motor 26 is oriented on carriage 25 such that its axis of rotation is substantially parallel to slide bars 24 and such that line-grasping chuck 27 faces the end of slide bars 24 which is adjacent to jaws 21 and 22. A clamping head release device 28 is mounted on frame base 20 and an empty mandrel receiving bin 29 is placed in frame 20 beneath the line of jaws 21 and 22.

Referring more particularly to Figures 3, 4 and 5, clamping head release device 28 includes a cylindrical block 30 having an internal, fluted conical opening 31 facing the front of the apparatus. Block 30 is slidably mounted in sleeve extension 32 attached to gear box 33, gear box 33 being affixed to frame base 20. A rack 34, which is vertically reciprocable through gear box 33, is secured to piston rod 35 attached to a piston (not shown) which is vertically reciprocable within air cylinder 36 also affixed to frame 20 in a vertical position. Piston rod 35 is spring biased against upward movement.

Extending from the rear face of block 30 is a shaft 37 which extends through gear box 33 journaled for both axial sliding movement and rotational movement in gear box 33. A stop nut 38 affixed to the end of shaft 37 extending from the rear face of gear box 33 limits forward movement of shaft 37 and hence block 30. A compression spring 39 coiled under tension about shaft 37 bearing against the rear face of block 30 and the forward face of gear box 33 within sleeve 32 biases shaft 37, and hence block 30, to a forward extended position within gear box 33.

A spur gear 40 is coaxially positioned about shaft 37 with its teeth engaging the rack teeth on rack 34. Internally spur gear 40 is provided with a keyway extending parallel to the axis of rotation of shaft 37 which slidingly engages in an axial direction a lug radially projecting from shaft 37. Thus rotational movement imparted to spur gear 40 by vertical movement of rack 34 is transmitted to shaft 37 and hence block 30, but at the same time shaft 37 and block 30 are free to slide through gear housing 33 for a limited distance in an axial direction. The end 41 of shaft 37 when shaft 37 is forced rearwardly against the biasing of spring 39 abuts a sensitive actuating element 42 of an electric switch 43 to produce actuation of switch 43 as is more fully described hereinafter.

Referring more particularly to Figures 6, 7 and 8, jaws 21 and 22 are shown mounted on frame base 20 in greater detail. Each jaw 21 and 22 is a block essentially cylindrical in shape provided at one end with an internal conical opening 45. Jaws 21 and 22 are positioned on frame base 20 axially aligned with end openings 45 confronting each other and spaced apart. Jaw 22 is affixed to a shaft 46 at its end opposite opening 45. Shaft 46 is journaled at 47 above frame base 20 for both axial sliding and rotational movement. A compression spring 48 is coiled about shaft 46 between journal 47 and jaw 22 normally biasing jaw 22 toward jaw 21. A nut 49 on the outer end of shaft 46 limits inward movement of jaw 22 by abutting journal 47.

Jaw 21 at its end remote from opening 45 is similarly affixed to the end of an axial shaft 50. Shaft 50, however, is affixed at its other end to a horizontally reciprocable piston in air cylinder 51 which is affixed to frame base 20. The piston in double acting air cylinder 51 in the conventional manner is freely rotatable as well as axially slidable within cylinder 51 and consequently jaw 21, like jaw 22, is freely rotatable about the same axis.

To the rear of each jaw 21 and 22 and slightly inward therefrom toward the opposite jaw is positioned a V-notched block 55 (see Figure 11) mounted on frame base 20 in a vertical upright position with a V-notch 56 in its forward face and with the apex of its V-notch 56 positioned just rearwardly of the axis of rotation and alignment of jaws 21 and 22 such that a mandrel placed abutting each apex is positioned approximately aligned with jaws 21 and 22 just to the rear of the proper center of rotation in jaws 21 and 22. Each block 55 is horizontally divided along a line through its apex into a lower block 55a affixed to the frame base 20 and an upper block 55b pivotally hinged at 55c to its rear edge to lower block 55a such that the positioning of the end of a mandrel in V-notch 56 will cause upper block 55b to be displaced angularly in an upward direction. A cam lever 57 connected to the actuating element of an electric switch 58 affixed to frame base 20 is positioned immediately over each upper block 55b such that the angular displacement of each block 55b upon insertion of a mandrel in V-notches 56 will actuate each respective cam 57 and switch 58. Each pair of blocks 55a and 55b are spring biased against such angular displacement by a coil spring 59 connected between them under tension.

Referring more particularly to Figure 9, it will be seen that frame base 23 beneath slide rods 24 supports a motor 60, the output shaft of which is suitably connected to a right angle transmission box 61 driving a roller link belt 62 in turn driving a sprocket wheel 63 mounted on a shaft 64 which is rotatably mounted on frame base 23 perpendicular to slide rods 24 and located immediately beneath them at their end adjacent jaws 21 and 22 and frame base 20. Shaft 64 also carries a pair of sprockets 65 which are driven with shaft 64. Sprockets 65 are positioned outside of slide rods 24 and each carries a roller link chain 66 which parallels slide rods 24 and which is also carried by an idler sprocket wheel 67 on a shaft 68 mounted at the end of frame base 23 remote from frame 20 and extending across frame base 23 beneath tie rods 24. Each belt 66 is affixed to carriage 25 which is slidably mounted on slide rods 24. Motor 60 is thus connected to drive carriage 25 along slide rods 24 from one end to the other of frame base 23.

Carriage 25 supports a motor 26. The output shaft of motor 26 is directly connected to an electrically actuated clutch mechanism 70 which is in turn connected to one end of a shaft 71 journaled for rotational movement in journals 72 affixed to carriage 25. Shaft 71 is connected at its other end to line-grasping device 27.

Line-grasping device 27 (see Figure 10) includes a cylindrical extension 73 affixed to the end of shaft 71 provided with an internal bore 74 opening at the end of extension 73 remote from shaft 71. Bore 74 extends within extension 73, increasing in cross-section as it approaches shaft 71. A tube 75 slidably extends into bore 74 and is provided at its outer end with a radially extending flange 76 and at its inner end with a similar flange 77 which is slidable for a short distance within bore 74.

Near flange 77 tube 75 is provided with three openings 78 in each of which is positioned a ball bearing 79. The diameter of each ball bearing 79 is such that it can pass through its respective opening 78 but cannot move through the center of tube 75 because the remaining ball bearings 79 are limited in outward movement through their respective openings 78 by the size of bore 74. Ball bearings 79 in the outwardly extended position of tube 75 are jammed together by reason of the relatively restricted diameter of bore 74. In the inwardly retracted position of tube 75 ball bearings 79 are free to move well away from the jammed position because in such positioning of tube 75 ball bearings 79 are in a less restricted portion of bore 74. A compression spring 80 is positioned to bear against flange 77 to bias tube 75 to its outwardly extended position in which ball bearings 79 are jammed.

A clevis 81 is pivotally secured to carriage 25 at 82 in a position such that its forked ends can be brought to bear in an axial direction on flange 76 to force tube 75 into bore 74 releasing the jamming of ball bearings 79. An air cylinder 83 mounted beneath carriage 25 and affixed thereto has its piston member pivotally linked at its outer end 84 to the remote end of clevis 81 in a manner permitting air cylinder 83 to pivot clevis 81. Cylinder 83 is spring biased to withdraw clevis 81 from contact with flange 76.

Beneath line-grasping device 27 a brake arm 85 is pivotally mounted on carriage 25 with its upper end swinging through an arc approaching the underside of line-grasping device 27. The upper end of lever 85 is provided with a small leather brake shoe 86 which can thus be brought to bear on the underside of line-grasping device 27 to hinder its rotation. Pivotal movement of brake lever 85 is produced by an air cylinder 87, the piston of which is pivotally linked at 88 to brake lever 85. Cylinder 87 is spring biased to hold brake shoe 86 in contact with line-grasping device 27.

The semi-automatic electrical control system for the apparatus, schematically represented in Figure 12, includes a manually operated push button 100 (see Figures 1 and 9) located on frame 23 at its end adjacent to frame 20. Push button 100 is of the spring return type and actuates normally open contacts 100a and normally open contacts 100b.

Six electrical control relays 101, 102, 103, 104, 105 and 106 are employed in the control circuits. Relay 101 operates normally open contacts 101a and normally open contacts 101b. Relay 102 operates normally closed contacts 102a. Relay 103 operates normally open contacts 103a. Relay 104 operates normally open contacts 104a and normally open contacts 104b. Relay 105 operates normally closed contacts 105a. Relay 106 operates normally open contacts 106a and normally closed contacts 106b.

Four cams, 107, 108, 109 and 110, are positioned to actuate electrical switches 111, 112, 113, 114 and 115, in certain positions of carriage 25 on slide bars 24 (see Figure 1). Cams 107 and 108 are adjustably mounted on frame 23 along an upper long edge, cam 107 being closer to frame 20 than cam 108. Cams 107 and 108 are positioned at different levels and brush against respective contacts on switches 111 and 112, mounted one above the other on the side of carriage 25, as carriage 25 moves by each respective cam. Cams 109 and 110 are mounted one above the other on carriage 25 on the side opposite switches 111 and 112. Switches 113 and 114 are mounted one above the other on top of frame 23 near its end remote from frame 20 in position such that their contacts are brushed by cams 109 and 110, respectively as carriage 25 approaches the remote end of frame 23. Switch 115 is similarly mounted on top of frame 23 near its end adjacent frame 20 in such a position that its contact is brushed by cam 110 as carriage 25 approaches the end of frame 23 adjacent to frame 20.

Four solenoid actuated air valves 116, 117, 118 and 119 are employed in the control system. Solenoid valve 116 when actuated permits air to be delivered to air cylinder 51 to extend jaw 21 away from jaw 22 and when unactuated directs air to air cylinder 51 to force jaw 21 toward jaw 22. Solenoid valve 117 when actuated opens connection from the air supply to air cylinder 87. Solenoid valve 118 when actuated connects air cylinder 83 to the air supply. Solenoid valve 119 similarly operates air cylinder 36.

Two motor control relays 120 and 121 are employed to operate motor 60. Relay 120 closes circuits to motor 60 to drive carriage 25 from the end of slide bars 24 adjacent to frame 20 to the remote end of slide bars 24. Relay 120 also operates normally open contacts 120a. Relay 121 closes circuits to motor 60 to return carriage 25 from the remote end of slide bars 24.

A motor driven timer 122 is also employed. Timer 122 when actuated closes normally open contacts 122a after a timed period of delay and holds such contacts closed until timer 122 is de-energized. It thereupon releases contacts 122a and resets automatically.

An overload circuit breaker 123 is employed to protect the circuits involving relays 120 and 121. In addition the control circuits include elecrically operated magnetic clutch 70, motor 26 and electrical switches 43 and 58, previously described.

Two power circuits, a light duty circuit connected to low voltage power lines 124, and a heavy duty circuit connected to high voltage power lines 125, are employed to energize the various electrical components. The exact manner of connection of the various electrical control components will appear more fully by reference to Figure 12 and by reference to the following description of the operation of the entire apparatus.

Prior to commencement of operation, carriage 25 is at rest at the end of slide bars 24 adjacent to frame 20. Solenoid air valves 116 and 117 are energized holding jaws 21 and 22 apart and line-grasping device 27 open. Solenoid air valves 118 and 119 are released, clutch 70 is disengaged and motors 26 and 60 are at rest.

In operation, the operator takes a mandrel 150, suitably of the type mentioned in the aforenoted Judisch patent, on which is wound a vulcanized helical body 151 retained between a winding head 153 and a clamping head 152. With the clamping head 152 placed toward the left, the operator inserts the head of thumb screw 154 into fluted conical opening 31 in block 30, forcing block 30 rearwardly to contact end 41 of shaft 37 with contact 42 of switch 43.

Switch 43 and solenoid actuated air valve 119 are connected in series across power lines 124. Consequently, the rearward movement of block 30 opens solenoid valve 119 to admit air into cylinder 36 forcing rack 34 vertically upward to rotate spur gear 40, shaft 37 and, hence, block 30 counterclockwise. This movement by reason of the engagement of thumb screw 154 in fluted cone 31 loosens thumb screws 154 releasing clamping head 152 from its tight engagement with mandrel 150. When the clamping head and thumb screw are then withdrawn from engagement with cone 32, switch 43 again opens and solenoid air valve 119 closes. The spring in air cylinder 36 then draws rack 34 downward.

The operator then slides clamping head 152 slightly to the left, out of engagement with helix 151, and places mandrel 150 with its left end in V-notch 56 in the V-notched block 55 located immediately adjacent to jaw 21 and then slides the right end of the mandrel into the corresponding V-notch 56 in the other V-notched block 55. To facilitate this operation, an angle 130 is mounted on frame 20 to guide the right end of mandrel 150 into the proper position. The mandrel is pushed into contact with both V-notched blocks 55. The upper halves 55b of each are then angularly displaced engaging the respective cam followers 57 producing actuation of both switches 58.

Switches 58 are connected in series with relay coil 106 and switch 113 across power lines 124. Contact 106a shunts the series combination of switches 58. Thus as both switches 58 are actuated, a circuit is established which energizes relay 106 closing contacts 106a at the same time opening contacts 106b which are connected in series with solenoid air valve 116 across power lines 124. The consequent release of solenoid air valve 116 directs pressure in air cylinder 51 to force jaw 21 to move toward jaw 22 to receive the ends of mandrel 150 in their respective conical openings 45 and pulling mandrel 150 out of engagement with V-notched blocks 55. The subsequent release of switches 58 which accompanies this action has no effect on relay 106, however, because of the shunting action of relay contacts 106a.

The operator then grips the freed end of helix 151 (the left end, nearest clamping head 152) with his right hand and inserts it into the central bore of tube 75 in line-clamping device 27 extending it up in between ball bearings 79. With his left hand the operator then pushes down on push button 100.

Actuation of push button 100 closes contacts 100a and closes contacts 100b.

The closure of contacts 100a (referring to Figure 12) connects relay 102 between power lines 124 and connects relay 101 in series with closed contacts 105a between power lines 124. The consequent energization of relay 101 closes contacts 101a which shunt the momentary connection of push button contacts 100a, and closes contacts 101b which connect motor 26 across power lines 124 to start motor 26 rotating. Magnetic clutch 70, however, remains unengaged. The simultaneous energization of relay coil 102 breaks a circuit including in series solenoid air valve 118 and the normally closed contacts 102a connected between power lines 124, thus allowing air cylinder 87 to return to its normal spring-biased position in which clevis 81 is withdrawn from contact with flange 76 on tube 75. Ball bearings 79 then jam together grasping the end of helix 151 which has just been inserted between them.

The momentary closure of push button contacts 100b closes a circuit including in series cam 110 operated normally closed switch contacts 114a, push button contacts 100b, motor drive relay 120, and overload circuit breaker 123 connected between power lines 125. The consequent energization of relay 120 starts motor 60 in a direction drawing carriage 25 from its position close to mandrel 150 toward the remote end of slide bars 24. Relay operated contacts 120a establish a shunt about the momentary closure of push button contacts 100b, locking in the energization of coil 120.

The initial position of helix 151 just before carriage 25 starts to move is shown at A in Figure 2. As carriage 25 begins to move toward the remote end of frame 23 and slide bars 24, helix 151 is unwound from mandrel 150 for a portion of its length. At about the point that helix 151 reaches position B (see Figure 2), cam 107 engages switch 111 on carriage 25.

This closes a circuit including the parallel arrangement of magnetic clutch 70, control relay 103 and solenoid air valve 117 in series with switch contacts 111, closed switch contacts 112, closed relay contacts 105a, and closed relay contacts 101a between power lines 124. Energization of magnetic clutch 70 engages shaft 71 with motor 26, which as noted above has previously been started, thus producing rotation of shaft 71 and line-grasping device 27 in a direction reversing the pitch of the loops of helical body 151 where helical body 151 has been drawn into free space by the movement of carriage 25. Energization of relay 103 closes relay contacts 103a which shunt the momentarily closed cam operated switch 111 and thus holds the circuit after carriage 25 passes the point at which cam 107 engages switch 111. Energization of air valve 117 forces air into cylinder 87 driving it against its spring-biasing to release brake shoe 86 from its contact with line-grasping device 27 thus permitting unhindered rotation of line-grasping device 27 as clutch 70 is simultaneously engaged.

With line-grasping device 27 rotating and thereby reversing the pitch of helical body 151, carriage 25 continues to move down slide bars 24 to a point at which cam 108 engages switch 112 on carriage 25. This point is indicated as position C in Figure 2. Helical body 151 is then reversed to a substantial extent with an end still wound upon mandrel 150. Upon engagement of cam 108 and switch 112, switch 112 opens breaking the circuit to clutch 70, relay 103 and solenoid air valve 117. Thus clutch 70 becomes disengaged, brake shoe 86 is released to again contact device 27 to stop it from further rotation and relay 103 permits its contacts 103a to open breaking the shunt about switch contacts 111 so that immediately after the momentary break in switch contacts 112, their subsequent closure has no immediate effect upon the electrical control circuit.

Carriage 25, still being driven by motor 60 toward the remote end of slide bars 24, continues to draw the remainder of helical body 151 from mandrel 150 until the end of helical body 151 is completely removed from mandrel 150. As the coils which remain wound upon mandrel 150 are drawn into free space, they fall into the reverse pitch which has been imparted to the free-space portion of helical body 151 by the rotation of the motor 26 and line-grasping device 27.

At about the point that helical body 151 falls completely into free space, attached only to line-grasping device 27, cam 109 and cam 110 brush against the contacts of switches 113 and 114, respectively. At this point the positions of helical body 151 and of line-grasping device 27 are as indicated in position D in Figure 2. Since switch 113 is in series with switches 58, its momentary opening permits relay 106 to de-energize, releasing holding contacts 106a which were shunting switches 58, and permitting contacts 106b to close. The subsequent closure of switch 113, after its momentary actuation, fails to restore the circuits energizing relay 106 because of the consequent opening of holding contacts 106a and because switches 58 are normally open. Since relay contacts 106b are in series with solenoid valve 116, their closure upon release of relay 106 energizes valve 116 to connect the air supply to air cylinder 51 to draw jaw 21 away from jaw 22, releasing the grip of jaws 21 and 22 on the ends of mandrel 150, thereby dropping mandrel 150 into bin 29 and positioning jaws 21 and 22 to receive a fresh mandrel 150 when it is inserted into V-notched blocks 55. Curved channels 131, which receive the ends of mandrel 150 as it drops from jaws 21 and 22, facilitate guiding mandrel 150 into receiving bin 29.

The momentary actuation of switch 114 opens its normally closed contacts 114a and closes its normally open contacts 114b.

The momentary opening of switch contacts 114a breaks the circuit including motor relay 120 which was established by the closure of push button contacts 100b, consequently releasing relay 120 to open the circuits which cause motor 60 to drive carriage 25 toward the remote end of slide bars 24. At the same time relay 120 opens its holding contacts 120a which shunt push button contacts 100b so that after the momentary opening of switch contacts 114a, the circuit cannot be re-established by closure of contacts 114a and carriage 25 stops.

The simultaneous momentary closure of switch contacts 114b closes a circuit including in series switch contacts 114b, relay 104, and normally closed switch 115 connected across power lines 125 and thus energizes relay 104. The energization of relay 104 closes contacts 104a which shunt the momentarily operated contacts 114b to hold to circuit which energizes relay 104.

The energization of relay 104 also closes relay contacts 104b which are connected in series with timer 122 across power lines 125. Timer 122 is set to delay closure of its contacts 122a until sufficient time has elapsed to assure complete unwinding of the end of helical body 151 from mandrel 150 and to permit helical body 151 to fall into the position indicated as position D in Figure 2. This is usually a matter of one or two seconds.

When timer 122 times out, timer contacts 122a close establishing a circuit including in series overload circuit breaker 123, motor 60 reversing control relay 121, and timer contacts 122a connected between power lines 125. Motor control relay 121 is thereby actuated to start motor 60 in a direction drawing carriage 25 back toward the end of frame 23 adjacent to frame 20 and jaws 21 and 22.

Relay 105 is connected in parallel with motor control relay 121 and consequently it is energized simultaneously with motor control relay 121. The energization of relay 105 opens normally closed relay contacts 105a which, as before noted, are connected in series with the circuit through relay contacts 101a which energizes relay 101. Consequently, the actuation of contacts 105a opens this circuit releasing relay 101 to open its contacts 101a which had been holding the circuit energizing both relay 101 and relay 102. Relay 102 is thus also released by the actuation of timer contacts 122a. Relay contacts 102a are thereby closed to energize solenoid valve 118 and connect air to air cylinder 83 driving clevis lever 81 into contact with flange 76 and forcing tube 75 into bore 74. The grasp of ball bearings 79 on the end of helical body 151 is thus released substantially simultaneously with the initial reverse movement of carriage 25. Helical body 151 therefore falls into the space beneath frame 23 between slide bars 24 where it may be gathered by a suitable receiving bin or the like (not shown).

Release of control relay 101 also opens relay contacts 101b and therefore breaks the circuit powering motor 26. Motor 26 thus is stopped as carriage 25 begins its reverse movement.

As carriage 25 returns to its initial position, the momentary actuations of the various cam-operated switches 111, 112, 113, and 114 have no effect upon the operation of the control circuits since each of their respective circuits are held open or closed by other means.

As carriage 25 reaches its final position adjacent to frame 20, cam 109 brushes the contact member of switch 115 producing a momentary opening of switch 115 breaking the circuit energizing relay 104 which had been established by the prior momentary closure of switch contact 114b. The release of relay 104 consequently releases holding contacts 104a, preventing continued energization of relays 104 after the momentary opening of switch contacts 115, and opens relay contacts 104b releasing timer 122.

Timer switch contacts 122a are thereby opened and timer 122 is reset automatically. The opening of timer contacts 122a breaks the circuit which energizes motor 60 reversing control relay 121 and relay 105, thereby stopping motor 60 to permit carriage 25 to come to rest in position for the next cycle of operation and closing relay contacts 105a to re-establish a potential circuit to holding relay 101 for energization upon subsequent closure of push button contacts in 100a in the next cycle of operation.

At this point the cycle of operation has been completed and the apparatus is ready to receive the next mandrel 150 containing a helical body 151 to perform a simultaneous reversing and unwinding operation as described above.

The preceding description is, of course, limited to a selected illustration of an apparatus constructed in accordance with my invention for carrying out the process of my invention. It will be obvious to those skilled in the art that the apparatus can be subjected to many variations. One such variation in apparatus construction is shown in co-pending Day application Serial No. 479,836, filed January 4, 1955.

I claim:

1. An apparatus for simultaneously unwinding and reversing the pitch of an elongated resilient body wound in a helix upon a mandrel which comprises a pair of freely rotatable aligned jaws mounted confronting each other for axially receiving opposite ends of said mandrel upon which said resilient body is wound, a chuck for receiving and grasping an end of said elongated body, means for driving said chuck in a line at an angle to the line of said jaws from a position adjacent thereto to a more remote position, means for rotating said chuck about an axis at approximately in the line of drive of said chuck to impart a reverse pitch to said elongated body from that in which said elongated body is wound upon said mandrel, and means operating said chuck rotating means during the operation of said chuck driving means.

2. An apparatus for simultaneously unwinding and reversing the pitch of an elongated resilient body wound in a helix upon a mandrel which comprises a pair of freely rotatable aligned jaws mounted confronting each other for axially receiving opposite ends of said mandrel upon which said resilient body is wound, a chuck for receiving and grasping an end of said elongated body, means for rotating said chuck to impart a reverse pitch to said elongated body from that in which said elongated body is wound upon said mandrel, a carriage upon which said chuck and said chuck rotating means are mounted, an open-ended race disposed at an angle to the line of said jaws slidably receiving said carriage along a line approximately in line with the axis of rotation of said chuck and having an end adjacent to the line of said jaws and an end more remote from the line of said jaws, means for driving said carriage along said race from a position adjacent to the line of said jaws to a more remote position, and means operating said chuck rotating means during operation of said chuck driving means.

3. An apparatus according to claim 2 in which said means operating said chuck rotating means is responsive as said carriage is driven along said race away from the line of said jaws to a position of said carriage in said race to commence operation of said chuck rotating means and to a position of said carriage more remote from the line of said jaws to terminate operation of said chuck rotating means.

4. An apparatus according to claim 2 in which said means operating said chuck rotating means includes a first cam and a first electric switch positioned for actuation by said first cam at a first position of said carriage in said race, a second cam and a second electric switch positioned for actuation by said second cam at a second position of said carriage in said race more remote from the line of said jaws than said first position, and means operatively connecting said first and second electric switches as said carriage is driven along said race away from the line of said jaws to commence operation of said chuck rotating means upon actuation of said first electric switch and to terminate operation of said chuck rotating means upon actuation of said second electric switch.

5. An apparatus according to claim 2 which further comprises means responsive to a position of said carriage adjacent to the end of said race remote from the line of said jaws for returning said carriage to said end of said race adjacent to the line of said jaws.

6. An apparatus according to claim 2 in which said chuck comprises a rotatable line-grasping means for grasping the end of said elongated body, means operatively connected to release said line-grasping means to permit said line-grasping device to receive the end of said elongated body, and brake means operatively connected to prevent rotation of said line-grasping means, in which said means operating said chuck rotating means is responsive as said chuck is driven along said race away from the line of said jaws to a position of said carriage in said race to release said brake means and commence operation of said chuck rotating means to rotate said line-grasping means and to a position of said carriage in said race more remote from the line of said jaws to reactuate said brake means and terminate operation of said chuck rotating means, and which apparatus further comprises control means operatively connected upon actuation when said carriage is at rest in said race adjacent to the line of said jaws to de-actuate said release means for said line-grasping means and start operation of said carriage driving means to drive said carriage toward the end of said race remote from the line of said jaws, and means responsive to a position of said carriage adjacent to the end of said race remote from the line of said jaws and operatively connected to actuate said means for releasing said line-grasping means and returning said carriage to the end of said race adjacent to the line of said jaws.

7. A method for simultaneously unwinding and reversing the pitch of an elongated resilient body wound in a helix upon a mandrel which comprises grasping an end of said body, withdrawing said end into free space to unwind said body from said mandrel in a line at an angle to the line of said mandrel, rotating the end of said body withdrawn into free space, as it is withdrawn and while the other end of said body remains upon said mandrel, in the reverse direction of the pitch of said body upon said mandrel, and releasing the withdrawn end of said body when its remaining end upon said mandrel becomes completely unwound therefrom and falls into free space.

8. A method according to claim 7 in which rotation of said end withdrawn into free space is commenced after commencement of withdrawal of said body from said mandrel and is terminated before said body is completely unwound from said mandrel.

References Cited in the file of this patent

UNITED STATES PATENTS

| | | |
|---|---|---|
| 2,173,096 | Campbell | Sept. 19, 1939 |
| 2,413,715 | Kemp et al. | Jan. 7, 1947 |
| 2,478,861 | Collins et al. | Aug. 9, 1949 |
| 2,525,285 | Collins et al. | Oct. 10, 1950 |
| 2,547,356 | Ames | Apr. 3, 1951 |
| 2,575,747 | Cook | Nov. 20, 1951 |